United States Patent
Kumawat et al.

(10) Patent No.: US 11,776,168 B2
(45) Date of Patent: Oct. 3, 2023

(54) EXTRACTING TEXTURES FROM TEXT BASED IMAGES

(71) Applicant: Adobe Inc., San Jose, CA (US)

(72) Inventors: Nirmal Kumawat, Dhoinda (IN); Zhaowen Wang, San Jose, CA (US); Zhifei Zhang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 180 days.

(21) Appl. No.: 17/219,391

(22) Filed: Mar. 31, 2021

(65) Prior Publication Data

US 2022/0319065 A1   Oct. 6, 2022

(51) Int. Cl.
| | |
|---|---|
| *G06T 11/00* | (2006.01) |
| *G06T 11/60* | (2006.01) |
| *G06T 5/00* | (2006.01) |
| *G06V 30/148* | (2022.01) |

(52) U.S. Cl.
CPC ............ *G06T 11/001* (2013.01); *G06T 5/005* (2013.01); *G06T 11/60* (2013.01); *G06V 30/153* (2022.01); *G06V 30/158* (2022.01)

(58) Field of Classification Search
CPC ....... G06T 11/001; G06T 11/60; G06T 5/005; G06V 30/10; G06V 30/153
See application file for complete search history.

(56) References Cited

U.S. PATENT DOCUMENTS

| | | | |
|---|---|---|---|
| 2017/0094235 A1* | 3/2017 | Monaghan | G06T 11/60 |
| 2017/0249292 A1* | 8/2017 | Constable | G06F 40/205 |
| 2019/0354261 A1* | 11/2019 | Zhao | G06F 3/04817 |

OTHER PUBLICATIONS

Zhangyang Wang et al. "DeepFont: Identify Your Font from An Image"; MM '15: Proceedings of the 23rd ACM international conference on Multimedia; Oct. 1, 2015; pp. 451-459https://doi.org/10.1145/2733373.2806219.

Yang, Shuai & Wang, Zhangyang & Wang, Zhaowen & Xu, Ning & Liu, Jiaying & Guo, Zongming. (2019). Controllable Artistic Text Style Transfer via Shape-Matching GAN. 4441-4450. 10.1109/ICCV.2019.00454.

(Continued)

*Primary Examiner* — Michelle Chin
(74) *Attorney, Agent, or Firm* — Keller Preece PLLC

(57) ABSTRACT

This disclosure describes one or more implementations of systems, non-transitory computer-readable media, and methods that extract a texture from embedded text within a digital image utilizing kerning-adjusted glyphs. For example, the disclosed systems utilize text recognition and text segmentation to identify and segment glyphs from embedded text depicted in a digital image. Subsequently, in some implementations, the disclosed systems determine optimistic kerning values between consecutive glyphs and utilize the kerning values to reduce gaps between the consecutive glyphs. Furthermore, in one or more implementations, the disclosed systems generate a synthesized texture utilizing the kerning-value-adjusted glyphs by utilizing image inpainting on the textures corresponding to the kerning-value-adjusted glyphs. Moreover, in certain instances, the disclosed systems apply a target texture to a target digital text based on the generated synthesized texture.

20 Claims, 9 Drawing Sheets

(56) References Cited

OTHER PUBLICATIONS

Bruno Galerne et al.; "Gaussian Texture Inpainting"; HAL archives-ouvertes.fr; 2016; HAL Id: hal-01428428; https://hal.archives-ouvertes.fr/hal-01428428v1/document.

Xu, Xingqian & Zhang, Zhifei & Wang, Zhaowen & Price, Brian & Wang, Zhonghao & Shi, Humphrey. (2020). "Rethinking Text Segmentation: A Novel Dataset and A Text-Specific Refinement Approach"; https://arxiv.org/pdf/2011.14021.pdf.

C. Yang et al., High-resolution Image Inpainting Using Multiscale Neural Patch Synthesis, In Proceedings of the IEEE Conference on Computer Vision and Pattern Recognition, pp. 6721-6729, (2017).

J. Yu et al., Generative Image Inpainting with Contextual Attention, In Proceedings of the IEEE Conference on Computer Vision and Pattern Recognition, pp. 5505-5514, (2018).

Y. Zeng et al., High-resolution Image Inpainting With Iterative Confidence Feedback and Guided Upsampling, arrXiv:2005.11742, (2020).

\* cited by examiner

EXTRACTING TEXTURES FROM TEXT BASED IMAGES

BACKGROUND

Recent years have seen an increase in the utilization of stylistic digital text within computer graphics and digital content. For example, many conventional digital graphics systems apply graphical elements such as colors, gradients, textures, and other artistic elements to digital text. Often designers may try to replicate a text in another design. While conventional systems exist for text recognition, conventional systems typically do not allow for extraction of textures from text in a digital image.

SUMMARY

This disclosure describes one or more implementations of systems, non-transitory computer-readable media, and methods that extract a texture from embedded text within a digital image to utilize the extracted texture to modify a target digital text object. For instance, the disclosed systems utilize text recognition and text segmentation to identify and segment glyphs (of an embedded text) from a digital image. Upon identifying and segmenting the glyphs, the disclosed systems determine kerning values between consecutive glyphs and utilize the kerning values to reduce gaps between the consecutive glyphs. Subsequently, the disclosed systems generate a synthesized texture utilizing the kerning-value-adjusted glyphs by utilizing image inpainting on the textures corresponding to the kerning value adjusted glyphs. In certain instances, the disclosed systems utilize the synthesized texture to search for existing textures and/or directly apply the synthesized texture to another digital object.

BRIEF DESCRIPTION OF THE DRAWINGS

The detailed description is described with reference to the accompanying drawings in which.

DETAILED DESCRIPTION

Figure 1:
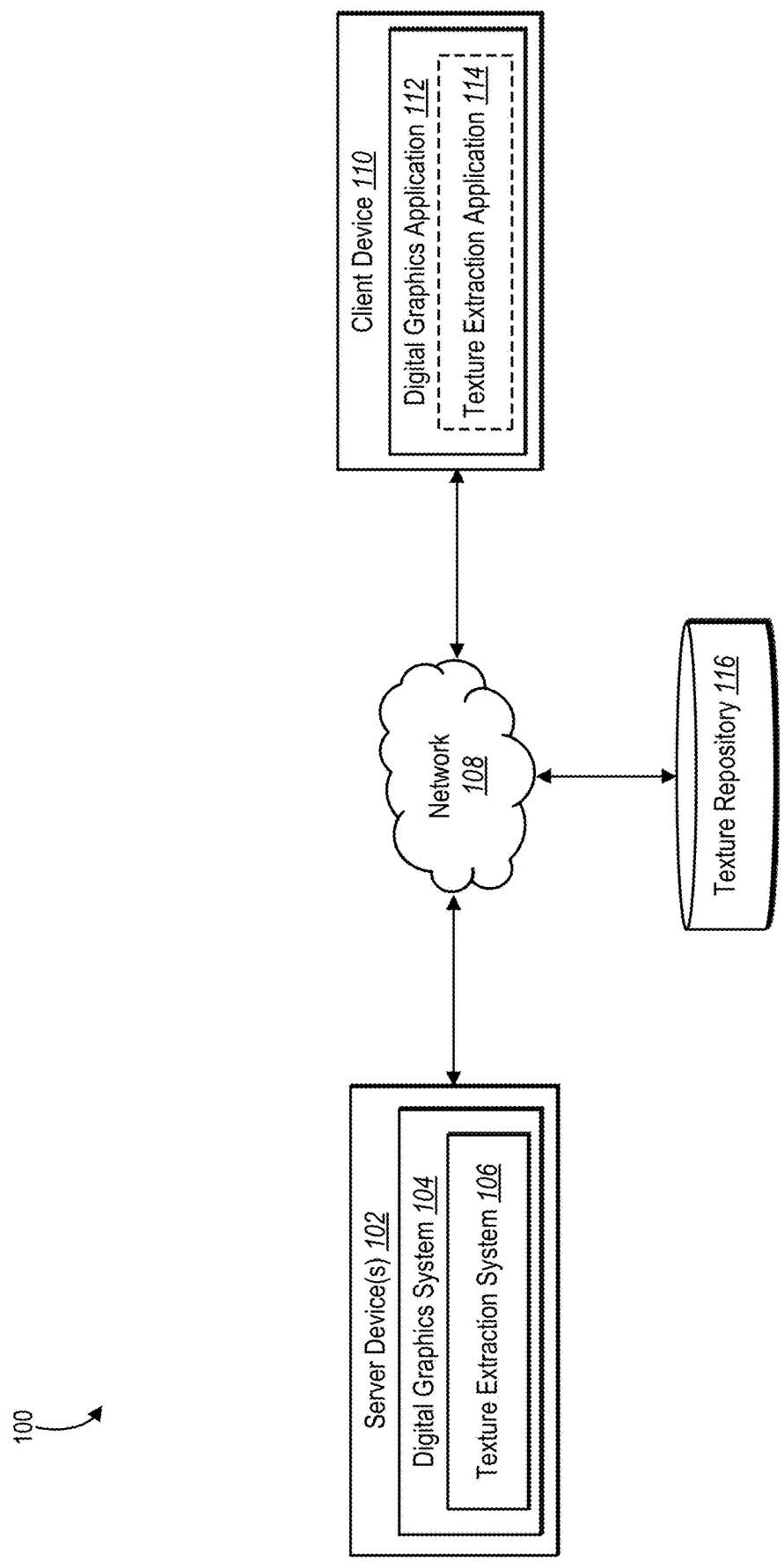
FIG. 1 illustrates a schematic diagram of an example system in which the texture extraction system operates in accordance with one or more implementations.

One or more implementations of a texture extraction system extract a texture from embedded text within a digital image using kerning-adjusted glyphs corresponding to the embedded text. For example, the texture extraction system identifies glyphs (having textures) that are depicted within a digital image. Furthermore, in some implementations, the texture extraction system adjusts the positions of the glyphs utilizing kerning values between consecutive glyphs. Then, in one or more implementations, the texture extraction system generates a synthesized texture from the textures depicted in the glyphs while positioned in their kerning-value-adjusted positions. Moreover, in certain instances, the texture extraction system applies a texture to a target digital text based on the synthesized texture.

As mentioned above, in some implementations, the texture extraction system identifies glyphs from within a digital image. In some cases, the texture extraction system utilizes a text recognition model to identify glyphs from embedded text (e.g., foreground and/or background embedded text) within the digital image. In one or more implementations, the texture extraction system segments the glyphs from the digital image. For example, the texture extraction system segments the glyphs such that various combinations of, but not limited to, the background, edge effects, shadow effects, halo effects, decorative strokes, and/or 3D effects are removed from the digital image to result in the glyphs with their depicted textures. Indeed, in some cases, the texture extraction system generates a text-digital image that depicts the segmented glyphs.

Additionally, in one or more implementations, the texture extraction system generates a synthesized texture from the glyphs upon adjusting the positions of the glyphs utilizing kerning values. In particular, in some implementations, the texture extraction system adjusts the positions of the identified glyphs using kerning values between consecutive glyphs to reduce gaps between the consecutive glyphs. In certain implementations, the texture extraction system utilizes kerning distance values between bounding boxes of consecutive glyphs as the kerning values. In one or more implementations, the texture extraction system utilizes multiple kerning distances between the right-most and left-most pixel positions of consecutive glyphs within different partitions of the consecutive glyphs to determine kerning values (e.g., using an averaged kerning distance) between the consecutive glyphs. This kerning value, in some implementations, is then utilized by the texture extraction system to reposition the glyphs such that gaps between the consecutive glyphs are reduced. Subsequently, in one or more implementations, the texture extraction system inpaints the textures depicted in the kerning-adjusted glyphs to generate a synthesized texture. Indeed, in some implementations, the texture extraction system 106 generates a synthesized texture from textures depicted in embedded text of a digital image even when the digital image (and the depicted text) are rasterized without layers or differentiated objects within the digital image.

Furthermore, in certain instances, the texture extraction system applies a texture to a target digital image using the generated synthesized texture. For example, the texture extraction system searches through a texture repository to identify target textures that match (or are similar to) the synthesized texture. Then, in one or more implementations, the texture extraction system receives a selection from between the identified target textures and applies the selected target texture to a target object (such as, for example, digital text). In some cases, the texture extraction system directly applies the synthesized texture to a target object such that the target object depicts a similar texture as depicted in the embedded text of the input digital image. Accordingly, in one or more implementations, the texture extraction system utilizes a synthesized texture extracted from embedded text of a digital image to modify the visual appearance of a target object (within another digital content item).

The texture extraction system provides a number of advantages over conventional systems. For example, in contrast to conventional systems that rely on computationally demanding machine learning models, the texture extraction system efficiently utilizes less computational resources to extract textures from embedded text in a digital image by reducing the utilization of machine learning models in the texture extraction process. In particular, by inpainting textures in kerning adjusted glyphs, the texture extraction system is able to generate synthesized textures from embedded text that materially represent the texture depicted within the embedded text. Indeed, by utilizing kerning value position adjustments and inpainting on the identified glyphs, the texture extraction system foregoes the utilization of a deep learning model or GAN-based style transfer approach to result in a quicker and less computationally demanding approach to extract a texture from an embedded text within a digital image. Accordingly, the texture extraction system efficiently extracts textures from embedded text with less training, less storage space, and less processing requirements than some conventional systems.

In addition to utilizing less computationally demanding machine learning models, the texture extraction system also generates synthesized textures that accurately represent textures depicted within embedded text of a digital image. For instance, by reducing the gap between consecutive glyphs identified from a digital image using kerning value position adjustments, the texture extraction system is able to improve the inpainting of the textures from the collection of glyphs. This improved inpainting of the glyphs by the texture extraction system results in synthesized textures that materially (and accurately) represent the overall visual textures of embedded texts from input digital images.

Furthermore, due to the improvements in efficiency, the texture extraction system can easily extract textures accurately from embedded text depicted in digital images on a wider variety of computing devices (including mobile devices). Indeed, unlike conventional systems that may require dedicated cloud services to extract an accurate texture, the texture extraction system has the ability to be implemented locally on a number of computing devices such that the computing devices is able to receive an input digital image and extract a texture from embedded text depicted in the input digital image without relying on cloud computing or computationally demanding machine learning models. In addition, since, in one or more implementations, the texture extraction system does not rely on receiving masked regions, the texture extraction system is able to receive input digital images and apply target textures to target digital text from the textures depicted in embedded text of the input digital images with improved flexibility and less user selection and/or interaction. Additionally, unlike conventional systems with manual user selection processes, the texture extraction system automatically identifies glyphs and accurately (and consistently) generates a synthesized texture upon receiving a request from a user selection (e.g., a single-click action) with an input digital image.

Turning now to the figures, FIG. 1 illustrates a schematic diagram of one implementation of a system 100 (or environment) in which a texture extraction system operates in accordance with one or more implementations. As illustrated in FIG. 1, the system 100 includes server device(s) 102, a network 108, a client device 110, and a texture repository 116. As further illustrated in FIG. 1, the server device(s) 102, the client device 110, and the texture repository 116 communicate via the network 108.

As shown in FIG. 1, the server device(s) 102 include a digital graphics system 104 which further includes the texture extraction system 106. For example, the server device(s) includes, but is not limited to, a computing (or computer) device (as explained below with reference to FIG. 9). In some implementations, the texture extraction system 106 identifies glyphs from embedded text within a digital image. Additionally, in one or more implementations, the texture extraction system 106 utilizes kerning values between consecutive glyphs to adjust the positions of the identified glyphs to reduce gaps between consecutive glyphs. Upon determining kerning-adjusted glyphs, in some implementations, the texture extraction system 106 inpaints textures corresponding to the kerning-adjusted glyphs to generate a synthesized texture. In certain instances, the texture extraction system applies a target texture to a target digital text based on the synthesized texture.

Furthermore, as shown in FIG. 1, the system 100 includes the client device 110. In one or more implementations, the client device 110 includes, but is not limited to, a mobile device (e.g., smartphone, tablet), a laptop, a desktop, or any other type of computing device, including those explained below with reference to FIG. 9. In certain implementations, although not shown in FIG. 1, the client device 110 is operated by a user to perform a variety of functions (e.g., via the digital graphics application 112). For example, the client device 110 performs functions such as, but not limited to, receiving digital images, generating synthesized textures from embedded texts in digital images, receiving selections of target textures based on the synthesized textures, and applying textures to a target digital text object.

To access the functionalities of the texture extraction system 106 (as described above), in one or more implementations, a user interacts with the digital graphics application 112 on the client device 110. For instance, the digital graphics application 112 includes one or more software applications installed on the client device 110 (e.g., to generate synthesized textures and/or apply textures to digital text in accordance with one or more implementations herein). In some instances, the digital graphics application 112 is hosted on the server device(s) 102. In addition, when hosted on the server device(s), the digital graphics application 112 is accessed by the client device 110 through a web browser and/or another online interfacing platform and/or tool.

Although FIG. 1 illustrates the texture extraction system 106 being implemented by a particular component and/or device within the system 100 (e.g., the server device(s) 102), in some implementations, the texture extraction system 106 is implemented, in whole or part, by other computing devices and/or components in the system 100. For instance, in some implementations, the texture extraction system 106 is implemented on the client device 110 within the digital graphics application 112. In particular, in one or more implementations, the description of (and acts performed by)

the texture extraction system 106 are implemented (or performed by) the texture extraction application 114 when the client device 110 implements the texture extraction system 106. More specifically, in certain instances, the client device 110 (via an implementation of the texture extraction system 106 on the texture extraction application 114) generates synthesized textures and/or applies textures to digital text in accordance with one or more implementations. Indeed, as mentioned above, the texture extraction system 106 can easily extract textures accurately from embedded text depicted in digital images on a wider variety of computing devices (including mobile devices) without having to extensively rely on cloud computing.

As further shown in FIG. 1, the system 100 includes the texture repository 116. In some implementations, the texture repository 116 includes, but is not limited to, a server device, cloud service computing device, or any other type of computing device (including those explained below with reference to FIG. 9) that stores one or more textures (or texture files). For example, the texture repository 116 includes a collection of target textures such as, but not limited to Adobe Stock textures and/or collection of stock textures. In some instances, the texture extraction system 106 accesses the texture repository 116 to retrieve one or more target textures based on a generated synthesized texture. For example, the texture extraction system 106 utilizes a synthesized texture from embedded text of a digital image to search for target textures in the texture repository 116 in accordance with one or more implementations. Then, in some instances, the texture extraction system 106 applies a target texture from the texture repository 116 onto a target digital text in accordance with one or more implementations. Indeed, in some implementations, the texture extraction system 106 performs the above-mentioned tasks upon receiving a request from the client device 110 to utilize textures from the texture repository 116.

Additionally, as shown in FIG. 1, the system 100 includes the network 108. As mentioned above, in some instances, the network 108 enables communication between components of the system 100. In certain implementations, the network 108 includes a suitable network and may communicate using any communication platforms and technologies suitable for transporting data and/or communication signals, examples of which are described with reference to FIG. 9. Furthermore, although FIG. 1 illustrates the server device(s) 102, the client device 110, and the texture repository 116 communicating via the network 108, in certain implementations, the various components of the system 100 communicate and/or interact via other methods (e.g., the server device(s) 102 and the client device 110 communicating directly).

Figure 2:
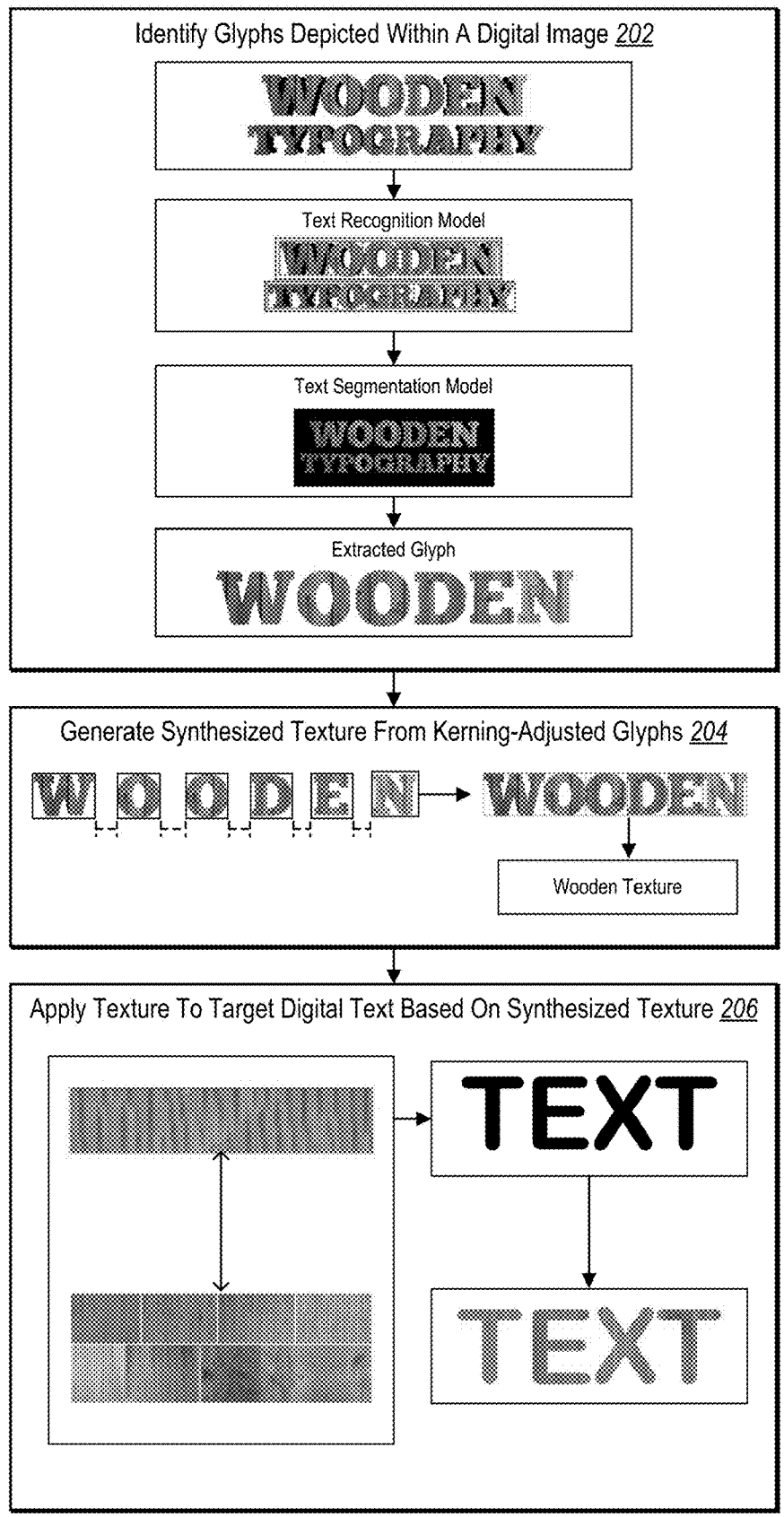
FIG. 2 illustrates an overview of a texture extraction system generating a synthesized texture from text embedded in a digital image in accordance with one or more implementations.

As previously mentioned, in one or more implementations, the texture extraction system 106 extracts a texture from embedded text within a digital image to utilize the extracted texture to modify a target digital object. For example, FIG. 2 illustrates an overview of the texture extraction system 106 generating a synthesized texture from text embedded in a digital image and utilizing the synthesized texture to modify a target digital object (in this case target digital text). More specifically, as shown in FIG. 2, the texture extraction system 106 identifies glyphs depicted within a digital image, generates a synthesized texture from kerning-adjusted glyphs, and then applies a texture to a target digital text based on the synthesized texture.

Indeed, as illustrated in FIG. 2, the texture extraction system 106 first identifies glyphs depicted within a digital image in an act 202. As shown in the act 202 of FIG. 2, the texture extraction system 106 utilizes a text recognition model to first identify text (as glyphs) within a digital image that depicts text (e.g., the embedded text of "WOODEN TYPOGRAPHY"). For instance, as illustrated in the act 202 of FIG. 2, the texture extraction system 106 identifies the depicted text and utilizes bounding boxes to indicate the glyphs within the digital image. Then, as shown in FIG. 2, the texture extraction system 106 utilizes a text segmentation model to segment the glyphs from the remainder of the digital image by removing the background, edge effects, shadows, and 3D effects from the digital image. As illustrated in the act 202 of FIG. 2, upon recognizing text utilizing a text recognition model and segmenting the glyphs from the digital image utilizing a text segmentation model, the texture extraction system 106 identifies extracted glyphs that depict a particular texture.

In one or more implementations, the term "image" includes a digital symbol, picture, icon, and/or other visual illustration depicting one or more objects. For instance, an image includes a digital file having a visual illustration and/or depiction of an object (e.g., human, place, or thing) and/or a visual illustration of a text object. For example, an image includes a visual illustration and/or depiction of an object with a text component having a visual texture (e.g., a building with a sign, a shirt with word decals, a poster with stylized text) and/or a depiction of a stylized text that includes a texture. Indeed, in some implementations, an image includes, but is not limited to, a digital file with the following extensions: JPEG, TIFF, BMP, PNG, RAW, or PDF. In some instances, an image includes a frame from a digital video file with the following extensions: MP4, MOV, WMV, or AVI.

Furthermore, in some implementations, the term "text" includes a visual depiction or representation of an element of speech or writing. In particular, text includes drawn, printed, or written characters in a variety of languages. In some instances, text includes a visual depiction of speech or writing with various combinations of typographical and/or stylistic elements such as, but not limited to, font, color, shadow, texture, and/or effects. In addition, in one or more implementations, the term "glyph" includes a visual representation of a character from a text using one or more specific shapes. In certain instances, a glyph includes a specific shape, design, or representation of a character. For example, a glyph includes a shape outline of a character within a text. Indeed, in some implementations, a text includes multiple characters with each character having a particular glyph.

As mentioned above, to recognize text depicted within a digital image, the texture extraction system 106 utilizes a text recognition model. In particular, in some implementations, the texture extraction system 106 utilizes a text recognition model to analyze a digital image to identify depictions of text within a digital image. In certain instances, the identifies text and generates a bounding box to indicate words and/or characters from the digital image. In some implementations, the texture extraction system 106 generates a bounding box for a word (e.g., a word-wise bounding box) and/or a bounding box for a character (e.g., a character-wise bounding box).

In one or more implementations, a text recognition model includes an algorithm or an application that implements a technique to recognize text (e.g., characters, words, glyphs) depicted within a digital image. In some implementations, the texture extraction system 106 utilizes a variety of text recognition models such as, but not limited to, an optical character recognition (OCR) model, an optical word recognition model, an intelligent character recognition (ICR)

model, an intelligent word recognition model to identify characters (or words) within a text that depicted in a digital image.

In some instances, the texture extraction system 106 determines bounding boxes around words and/or characters identified within a text depicted in a digital image. The bounding boxes include lines (or boundaries) that indicate an enclosed box around the left-most, right-most, top-most, and bottom-most visual pixel of a word and/or character. Moreover, in one or more implementations, the texture extraction system 106 utilizes the bounding boxes to segment glyphs (or characters) from the digital image. In some instances, the texture extraction system 106 also utilizes the bounding boxes to determine kerning values between consecutive glyphs while determining kerning-value adjusted positions for the glyphs.

In addition, upon identifying the text depicted within a digital image, in some implementations, the texture extraction system 106 crops the identified text from the digital image. For instance, the texture extraction system 106 crops words or individual characters from text that is depicted within digital image to obtain a portion of the digital image that depicts the text. In some instances, the texture extraction system 106 utilizes word-based and/or character-based bounding boxes to crop text from a digital image. Indeed, in certain instances, the texture extraction system 106 crops text from a digital image prior to utilizing a text segmentation model to extract glyphs from the identified text.

Then, as mentioned above, in one or more implementations, the texture extraction system 106 utilizes a text segmentation model to segment glyphs from the remainder of a digital image. In particular, the texture extraction system 106 utilizes a text segmentation model with the identified text depicted within a digital image (or cropped text portions form the digital image) to remove various parts of the digital image from the identified text to obtain a text-digital image (e.g., a text mask) that includes the identified text and corresponding textures while removing other background and visual effects corresponding to the text and around the text. For example, the texture extraction system 106 segments glyphs from a digital image depicting text through the removal of unrelated background and visual effects such as, but not limited to, shadow effects, halo effects, 3D effects, decorative strokes (or stroke thickness), and/or background components of the digital image in relation to the text. By removing such unrelated background and visual effects, the texture extraction system 106, in one or more implementations, generates a text-digital image (or text mask) that independently includes glyphs with textures from the digital image (e.g., without other visual components of the digital image).

In one or more implementations, a text segmentation model includes an algorithm or an application that implements an image segmentation process to partition a digital image into segments that include text as a segment. For example, a text segmentation model includes models that utilize neural networks (e.g., convolutional neural networks, U-Net, DenseNet). Furthermore, in some implementations, the texture extraction system 106 utilizes text segmentation models and/or tools that are based on a variety of approaches and/or techniques such as, but not limited to, image classification, clustering, histogram-based methods, and/or edge detection. In some implementations, the texture extraction system 106 utilizes a text segmentation model as described by Xu et al. in *Rethinking Text Segmentation: A Novel Dataset and a Text-Specific Refinement Approach*, arXiv: 2011.14021v1, (2020), the content of which is hereby incorporated by reference in its entirety.

As such, in some implementations (and as shown in FIG. 2), the texture extraction system 106 identifies text from a digital image. Then, as also shown in FIG. 2, the texture extraction system 106 segments the text from digital image such that the glyphs corresponding to the text and the textures depicted within the glyphs remain. Moreover, in one or more implementations, the texture extraction system 106 utilizes the glyphs and the textures depicted within the glyphs to generate a synthesized texture upon adjusting the positions of the glyphs utilizing kerning values between consecutive glyphs.

In some implementations, the term "texture" includes a visual appearance and/or depiction of a surface of an object. In some implementations, the texture includes the visual appearance and/or depiction of the surface of text depicted within a digital image. For example, a texture includes a surface color, surface pattern, surface visual smoothness, surface visual roughness, and/or a surface light property that is depicted and/or represented on the face of text within a digital image. In addition, in certain instances, a text includes various glyphs that include separate (e.g., individual) textures on each glyph.

As shown in the act 204 of FIG. 2, the texture extraction system 106 generates a synthesized texture from kerning-adjusted glyphs (e.g., the identified glyphs from the act 202). In particular, as shown in FIG. 2, the texture extraction system 106 determines kerning values between consecutive glyphs from the identified glyphs. Then, as also shown in FIG. 2, the texture extraction system 106 adjusts positions of the glyphs to reduce the gap between the consecutive glyphs utilizing the kerning values. In some instances, the texture extraction system 106 determines and utilizes an optimistic kerning value computation that utilizes a kerning distance between bounding boxes and/or an average kerning distance between multiple partitions of the consecutive glyphs to adjust positions of the glyphs prior to generating a synthesized texture. Indeed, upon obtaining the kerning-adjusted glyphs, the texture extraction system 106 inpaints the textures from the kerning-adjusted glyphs to generate a synthesized texture that accounts for the textures within the kerning-adjusted glyphs. The texture extraction system 106 adjusting glyphs using kerning values and generating synthesized textures from the kerning-adjusted glyphs is described in greater detail below in relation to FIGS. 3-5.

Additionally, as shown in FIG. 2, the texture extraction system 106 applies a texture to a target digital object based on the synthesized texture in an act 206. As shown in FIG. 2, in some cases, the texture extraction system 106 utilizes the synthesized texture to search for similar textures that are applicable to the target digital text. Then, the texture extraction system 106 applies a selected texture from the searched textures to the target digital text. In some instances, the texture extraction system 106 directly applies the synthesized texture to the target digital text. Indeed, by applying a texture based on the synthesized texture or the synthesized texture directly to the target digital text, the texture extraction system 106 modifies the visual appearance of the target digital text on the surface of the target digital text. The texture extraction system 106 applying a texture based on a synthesized texture is described in greater detail below (e.g., in relation to FIG. 6).

As previously mentioned, in one or more implementations, the texture extraction system 106 generates a synthesized texture from glyphs extracted from a digital image utilizing optimistic kerning value-based position adjustments of the glyphs. In some instances, the texture extraction system 106 determines kerning values between bounding boxes of consecutive glyphs and utilizes the kerning values to reduce gaps between the consecutive glyphs prior to generating a synthesized texture from the kerning-adjusted glyphs. For example, FIG. 3 illustrates the texture extraction system 106 utilizing kerning values from bounding boxes of glyphs to adjust the positions of the glyphs prior to generating a synthesized texture.

Figure 3:
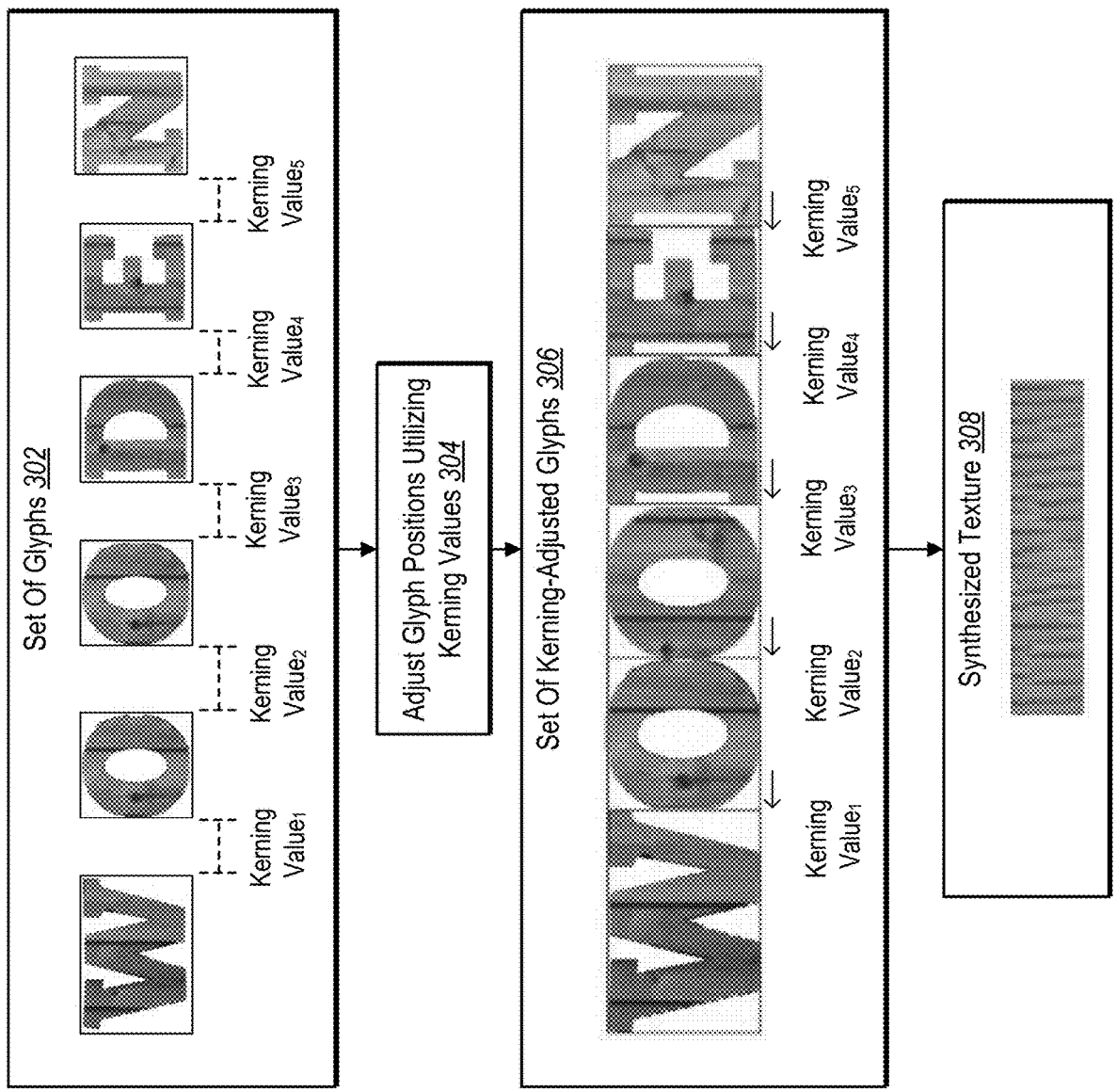
FIG. 3 illustrates a texture extraction system generating a synthesized texture utilizing kerning-adjusted glyphs based on bounding boxes between consecutive glyphs in accordance with one or more implementations.

As shown in FIG. 3, the texture extraction system 106 first identifies kerning values between bounding boxes of consecutive glyphs from a set of glyphs 302. Indeed, as shown in FIG. 3, the texture extraction system 106 determines a kerning value 1 through kerning value 5 for the gaps between consecutive glyphs from the set of glyphs 302. Then, as illustrated in FIG. 3, the texture extraction system 106 adjusts the glyph positions utilizing the kerning values in an act 304 to generate a set of kerning-adjusted glyphs 306. Indeed, as shown in FIG. 3, the texture extraction system 106 reduces gaps between consecutive glyphs from the set of glyphs 302 by repositioning the glyphs (or the glyphs bounding boxes) by a distance indicated by the kerning value between the bounding boxes (e.g., kerning values 1 through kerning value 5). Subsequently, as shown in FIG. 3, the texture extraction system 106 generates a synthesized texture 308 utilizing the set of kerning-adjusted glyphs 306.

In one or more implementations, the term "kerning value" includes a value that represents a spacing between glyphs (or characters). In particular, in some implementations, a kerning value includes a representational value that indicates an overall (or estimated) spacing between a pair of glyphs. The kerning value, in some implementations, includes a numerical unit that indicates a spacing in relation to a font unit (e.g., a fraction of an em of a glyph or character that represents a point size of the glyph or character). In certain instances, the texture extraction system 106 utilizes one or more kerning distances between a pair of glyphs to determine a kerning value. For example, the term "kerning distance" includes a measure of spacing between one or more specific points from a pair of glyphs. In particular, in one or more implementations, a kerning distance includes a measurement of spacing between a particular point of a glyph and a particular point of another glyph in pixels, millimeters, and/or a number of units over an em.

To illustrate, as shown in FIG. 3, the texture extraction system 106 determines a kerning distance between a right-most boundary position (e.g., x coordinate position) of a bounding box of a glyph and a left-most boundary position of a bounding box of the next consecutive glyph. Indeed, as shown in FIG. 3, the texture extraction system 106 determines a kerning value 1 (for the set of glyphs 302) by determining a kerning distance between a right-most boundary position of a bounding box for the "W" glyph and a left-most boundary position of a bounding box for the consecutive "O" glyph. As further shown in FIG. 3, the texture extraction system 106 determines kerning values 2 through kerning values 5 by determining kerning distances between the bounding boxes of the glyphs corresponding to the kerning values 2 through kerning values 5.

In certain instances, the texture extraction system 106 utilizes a right-most x coordinate position (xMax) of a first bounding box from a first glyph (bbox1) and a left-most x coordinate position (xMin) of a second bounding box from a second glyph (bbox2) to determine a kerning distance between the two bounding boxes. Then, in one or more implementations, the texture extraction system 106 utilizes a negative value of the kerning distance between the two bounding boxes as the kerning value (e.g., to represent a positional adjustment of the second glyph to the left to reduce a gap between the first and second glyph). For example, the texture extraction system 106 determines a kerning value between the right-most x coordinate position (xMax) of the first bounding box from the first glyph (bbox1) and the left-most x coordinate position (xMin) of the second bounding box from the second glyph (bbox2) utilizing the following function:

$$\text{Kerning Value} = -(\text{bbox2}\cdot x\text{Min} - \text{bbox1}\cdot x\text{Max}) \quad (1)$$

Then, to generate the set of kerning-adjusted glyphs, the texture extraction system 106 adjusts glyph positions utilizing the determined kerning values. For instance, as shown in FIG. 3, the texture extraction system 106 modifies x coordinate positions of the glyphs to reduce a gap between each consecutive glyph. In particular, for each glyph, the texture extraction system 106, in one or more implementations, generates updated x coordinate positions (UpdatedXPos) by utilizing the current x coordinate positions (CurrentXPos) of a glyph and the kerning value between the glyph and a consecutive (e.g., adjacent) glyph. Indeed, using the kerning value determined in function (1), in certain instances, the texture extraction system 106 determines updated x coordinate positions (UpdatedXPos) with a (negative) kerning value utilizing the following function:

$$\text{Updated}X\text{Pos} = \text{Current}X\text{Pos} + \text{Kerning Value} \quad (2)$$

In some implementations, the texture extraction system 106 utilizes zero as the kerning value for the first glyph in function (2) in order to anchor the first glyph as the starting point during the kerning value-based position adjustments. More specifically, in one or more implementations, the texture extraction system 106 utilizes a kerning value of zero for the first glyph such that the updated x coordinate position of the first glyph does not change from the current x coordinate position of the first glyph. In addition, although one or more implementations herein demonstrate the texture extraction system 106 utilizing negative kerning values to adjust positions of glyphs leftwards, in some implementations, the texture extraction system 106 utilizes positive kerning values between consecutive glyphs to adjust positions of the glyphs rightwards. For example, the texture extraction system 106 adjusts positions of the glyphs rightwards by adjusting the position of a first glyph rightward to shift the first glyph towards a second glyph (that is adjacent to the first glyph on the right side) and so forth for each subsequent glyph.

Furthermore, as shown in FIG. 3, upon generating a set of kerning-adjusted glyphs 306, the texture extraction system 106 generates a synthesized texture 308 from textures depicted within the set of kerning-adjusted glyphs 306. To generate a synthesized texture, in some implementations, the texture extraction system 106 utilizes textures depicted within a set of kerning-adjusted glyphs to fill in a background region of an object (e.g., a text-digital image or texture file) utilizing the textures depicted across the kerning-adjusted glyphs. In particular, in one or more implementations, the texture extraction system 106 utilizes the textures depicted within the kerning-adjusted glyphs to generate a texture sample that depicts the texture from the glyphs within a boundary of a texture image (e.g., fills the texture from border to border of a texture image or texture file).

In some cases, the texture extraction system 106 utilizes inpainting to generate a synthesized texture from textures depicted within a set of kerning-adjusted glyphs. For example, inpainting includes an image editing process in which missing (or blank) portions of an image are filled in utilizing a visual reference. For instance, inpainting includes an image editing process that fills missing (or blank) portions of a texture image (or texture file) by filling the missing portions of the texture image with textures depicted within a set of kerning-adjusted glyphs. In one or more implementations, the texture extraction system 106 utilizes a variety of digital inpainting approaches such as, but not limited to, partial differential equation-based inpainting, texture synthesis-based inpainting, exemplar-based inpainting, deep learning neural network inpainting, image completion-based inpainting, wavelet transformation-based inpainting and/or gaussian texture inpainting.

In one or more implementations, the texture extraction system 106 utilizes content-aware fill from Adobe Photoshop to fill a background with textures from the kerning-adjusted glyphs to generate a synthesized texture. As an example, the texture extraction system 106 utilizes an inpainting approach as described by C. Yang et al., *High-resolution Image Inpainting Using Multiscale Neural Patch Synthesis*, In Proceedings of the IEEE Conference on Computer Vision and Pattern Recognition, pages 6721-6729, (2017), the content of which is hereby incorporated by reference in its entirety. Additionally, another example of an inpainting approach includes that described by J. Yu et al., *Generative Image Inpainting with Contextual Attention*, In Proceedings of the IEEE Conference on Computer Vision and Pattern Recognition, pages 5505-5514, (2018), the content of which is hereby incorporated by reference in its entirety. Furthermore, another example of an inpainting approach includes that described by Y. Zeng et al., *High-resolution Image Inpainting With Iterative Confidence Feedback and Guided Upsampling*, arrXiv:2005.11742, (2020), the content of which is hereby incorporated by reference in its entirety.

Although one or more implementations illustrate the texture extraction system 106 adjusting positions of glyphs horizontally, in one or more implementations, the texture extraction system 106 adjusts the positions of glyphs in various directions prior to generating a synthesized texture. Indeed, in some implementations, the texture extraction system 106 determines kerning values from y coordinate positions of glyphs when a set of glyphs are positioned vertically. For example, the texture extraction system 106 determines kerning values by determining a kerning distance between a bottom-most boundary of a first glyph (from a bounding box) and a top-most boundary of a consecutive second glyph (from a bounding box). Then, in some implementations, the texture extraction system 106 positions the glyphs using the kerning values such that consecutive glyphs have a reduced gap (vertically) between the consecutive glyphs. Moreover, the texture extraction system 106 generates a synthesized texture (as described above) from textures belonging to the vertical kerning-adjusted glyphs.

In addition, in some implementations, the texture extraction system 106 adjusts positions of glyphs in various combinations of both vertical and horizontal directions (e.g., scattered and/or diagonal glyphs) prior to generating a synthesized texture. For example, in some instances, the texture extraction system 106 identifies an extracted set of glyphs that are not vertically or horizontally aligned in relation to each glyph in the set of glyphs. In such cases, the texture extraction system 106 identifies a kerning distance between various positions of bounding boxes of consecutive glyphs to adjust the position of the glyphs by a corresponding kerning value.

For instance, the texture extraction system 106 identifies a minimum and/or maximum kerning distance between edges of consecutive glyphs and utilizes the minimum and/or maximum kerning distance as the kerning value between the consecutive glyphs. In addition, in one or more implementations, the texture extraction system 106 adjusts the position of a glyph by the determined kerning value along a path created by the boundary box points from which the kerning value was determined. Indeed, in many instances, the texture extraction system 106 reduces a gap between consecutive glyphs utilizing the kerning value along the boundary box points to reduce gaps between the non-horizontal and/or non-vertical glyphs. Then, as described above, the texture extraction system 106 generates synthesized textures from the kerning-adjusted glyphs.

Figure 4:
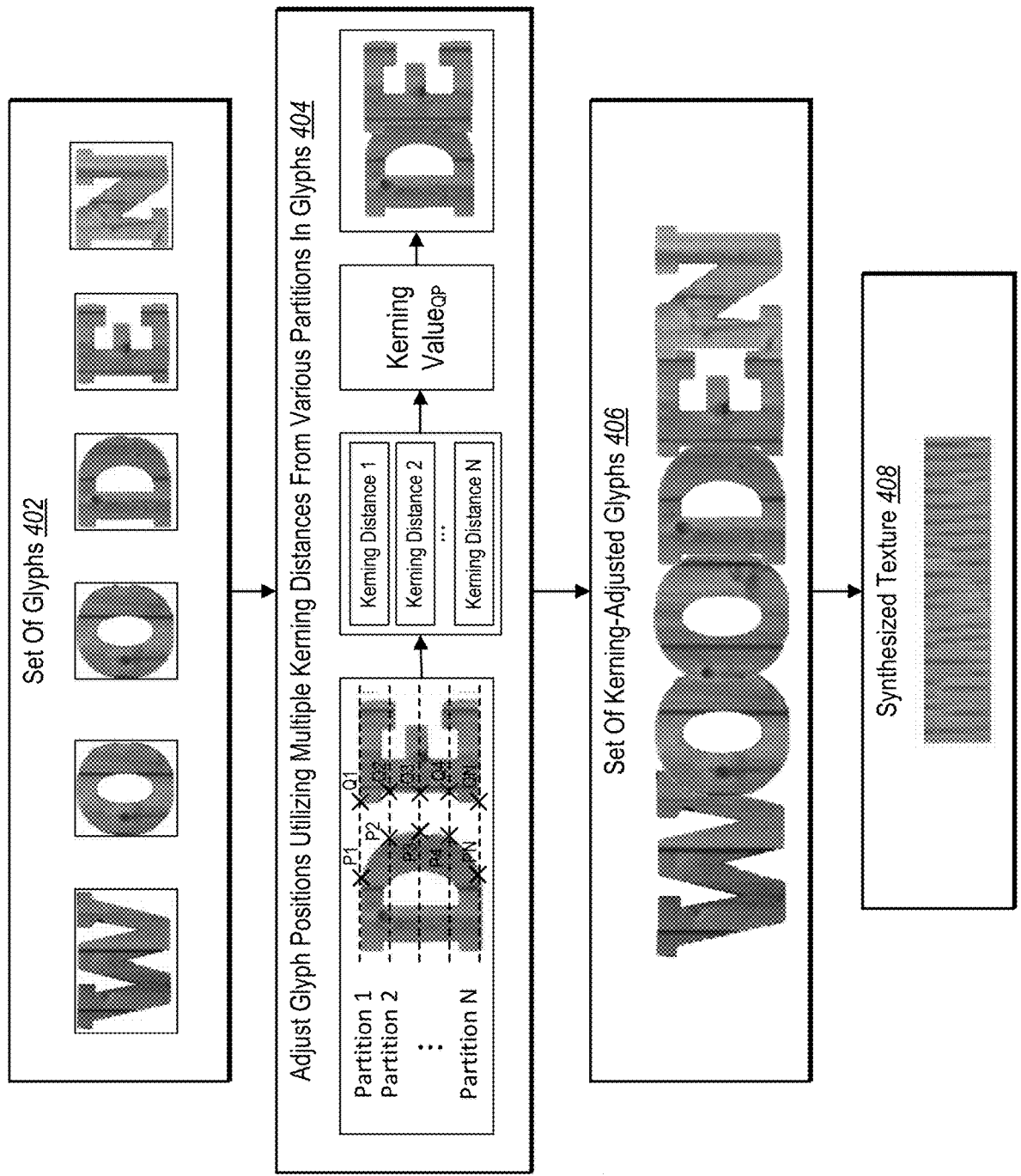
FIG. 4 illustrates a texture extraction system generating a synthesized texture utilizing kerning-adjusted glyphs based on multiple kerning distances between consecutive glyphs in accordance with one or more implementations.

As previously mentioned, in some instances, the texture extraction system 106 utilizes multiple kerning distances from multiple partitions between glyphs to determine a kerning value for adjusting glyph positions. For instance, FIG. 4 illustrates the texture extraction system 106, for a set of glyphs 402, adjusting glyph positions utilizing multiple kerning distances from various partitions in glyphs (in an act 404). Then, FIG. 4 illustrates the texture extraction system 106 utilizing the set of kerning-adjusted glyphs 406 to generate a synthesized texture 408.

In reference to act 404 of FIG. 4, the texture extraction system 106 determines a number of partitions between a pair of glyphs (e.g., partition 1 through partition N). Then, as shown in FIG. 4, the texture extraction system 106 determines a right-most pixel x coordinate position (e.g., $P_1$ to $P_N$) of the first glyph (e.g., "D") and a left-most pixel x coordinate (e.g., $Q_1$ to $Q_N$) for the consecutive glyph (e.g., "E") within each partition (e.g., partition 1 through partition N). As further illustrated in FIG. 4, utilizing these pixel x coordinates (e.g., $P_1$ to $P_N$ and $Q_1$ to $Q_N$), the texture extraction system 106 determines kerning distance value 1 through kerning distance value N (e.g., for each pair of pixel x coordinates within the different partitions). As further shown in FIG. 4, the texture extraction system 106 utilizes the kerning distance value 1 through kerning distance value N to determine a kerning value$_{OP}$ that is, then, utilized to reposition the consecutive glyphs to reduce the gap between the glyphs. Indeed, as shown in FIG. 4, the texture extraction system 106 determines kerning values and repositions each consecutive glyph from the set of glyphs 402 to generate the set of kerning-adjusted glyphs 406.

In some instances, the texture extraction system 106 utilizes intersections of the partitions as the pixel x coordinates of the glyphs to determine kerning distances between a pair of glyphs. In one or more implementations, the texture extraction system 106 utilizes a right-most pixel x coordinate of a first glyph and a left-most pixel x coordinate of a second glyph within each partition to determine kerning distances between the consecutive glyphs. For example, within each partition between consecutive glyphs, the texture extraction system 106 determines a shortest kerning distance from the pixels of the two consecutive glyphs.

Furthermore, in one or more implementations, the texture extraction system 106 identifies a number of partitions to utilize for glyphs in a set of glyphs from a user selection, preference setting, and/or a default setting. In some cases, the texture extraction system 106 determines the number of partitions based on sizes of the one or more glyphs. For example, the texture extraction system 106 utilizes a size of the largest (or smallest) glyph (in height) to determine a number of partitions (e.g., based on a ratio or a partition per each threshold increment of height).

In one or more implementations, the texture extraction system 106 determines partitions based on sizes of the glyphs (e.g., height of a glyph when horizontally aligned or width of the glyph when vertically aligned). For example, the texture extraction system 106 identifies a lowest height glyph (e.g., based on bounding boxes and/or the top-most and bottom-most pixel of the glyph) from a set of glyphs and utilizes the lowest height glyph to determine a number of partitions (e.g., a lower-case glyph that is lowest in height from other glyphs in the set of glyphs). Additionally, in some implementations, the texture extraction system 106 also utilizes the lowest height glyph to determine the partition placements for the glyphs in the set of glyphs. For instance, the texture extraction system 106 sets partitions for the glyphs to account for regions of the set of glyphs that are within the range of the lowest height glyph. Then, in one or more implementations, the texture extraction system 106 determines kerning distances between consecutive glyphs within the partitions corresponding to the lowest height glyph.

Upon determining multiple kerning distances between consecutive glyphs at multiple partitions, the texture extraction system 106, in one or more implementations, utilizes the multiple kerning distances to determine a kerning value between the consecutive glyphs. For example, the texture extraction system 106 calculates a kerning value from multiple kerning distances utilizing an average kerning distance from the multiple kerning distances as the kerning value. Although one or more implementations illustrates the texture extraction system 106 utilizing an averaged kerning distance as the kerning value, the texture extraction system 106, in some implementations, utilizes various approaches such as, but not limited to, utilizing a minimum kerning distance, a maximum kerning distance, a mode kerning distance, and/or median kerning distance from the multiple kerning distances as the kerning value.

To illustrate, in some implementations, the texture extraction system 106 determines an N number of partitions for glyphs within a set of glyphs. Then, in one or more implementations, the texture extraction system 106 determines an average from the kerning distances ($Q_i$–$P_i$) between a left-most position ($Q_i$) within a second glyph (e.g., a glyph on the right side) and a right-most position ($P_i$) within a first glyph (e.g., a glyph on the left side) for an N number of partitions as the kerning value between the glyphs. Indeed, in one or more instances, the texture extraction system 106 determines an average kerning distance between consecutive glyphs as a kerning value utilizing the following function:

$$Distance_{avg} = \frac{1}{N}\sum_{i=0}^{N}(Q_i - P_i) \qquad (3)$$

Kerning Value = $-Distance_{avg}$

In one or more implementations, the texture extraction system 106 determines a kerning value utilizing function (3) for each pair of consecutive glyphs within a set of glyphs.

Subsequently, to generate a set of kerning-adjusted glyphs, the texture extraction system 106 adjusts glyph positions utilizing the determined kerning values (utilizing kerning distances from multiple partitions as described above). For example, as shown in FIG. 4, the texture extraction system 106 modifies x coordinate positions of the glyphs to reduce a gap between each consecutive glyph. More specifically, for each glyph, the texture extraction system 106, in one or more implementations, generates updated x coordinate positions (UpdatedXPos) by utilizing current x coordinate positions (CurrentXPos) of the glyph and the kerning value between the glyph and a consecutive (e.g., adjacent) glyph as described above (e.g., in relation to function (2)). As mentioned above, in some implementations, the texture extraction system 106 also utilizes a positive kerning value to reposition glyphs to the right to reduce gaps between consecutive glyphs. In some cases, the texture extraction system 106 updates x coordinate positions of pixels corresponding to the glyphs and/or the x coordinate positions of the bounding boxes of the glyphs.

Moreover, in one or more implementations, the texture extraction system 106 generates a set of kerning-adjusted glyphs that overlap when reducing gaps between consecutive glyphs utilizing kerning values from multiple kerning distances between the consecutive glyphs. In certain instances, the texture extraction system 106 utilizes less processing resources to inpaint a set of kerning-adjusted glyphs that overlap as the texture extraction system 106 fills less gaps between the kerning-adjusted glyphs. Indeed, in some implementations, the texture extraction system 106 improves processing efficiency and speed when reducing gaps between glyphs by utilizing kerning values determined from multiple kerning distances between the consecutive glyphs.

Although one or more implementations illustrate the texture extraction system 106 adjusting positions of the glyphs horizontally utilizing kerning distances from horizontal partitions, in some cases, the texture extraction system 106 also determines kerning values from multiple kerning distances utilizing multiple partitions for glyphs that are vertically positioned and/or glyphs that positioned in a combination of vertical and horizontal positions (e.g., scattered and/or diagonal glyphs). More specifically, in some instances, the texture extraction system 106 determines multiple partitions in the direction of the relative glyph positions (e.g., vertical partitions when glyphs are positioned vertically and/or an aligned partition when the glyphs are positioned vertically and horizontally (in a combination)).

Then, in one or more implementations, the texture extraction system 106 determines multiple kerning distances within (or along) the multiple partitions that are created in the direction of the relative glyph positions (to determine kerning values for consecutive glyphs). Indeed, in some implementations, the texture extraction system 106 utilizes such kerning values to reduce gaps between consecutive glyphs in a vertical direction and/or a vertical and horizontal direction to generate the kerning-adjusted glyphs. Additionally, in one or more instances, the texture extraction system 106 then generates a synthesized texture (as described above) from textures belonging to the vertically (and/or vertically and horizontally) kerning-adjusted glyphs.

Furthermore, in some cases, embedded text from a digital image includes glyphs that depict a varying texture. In particular, in some cases, glyphs from an embedded text may include a varying texture by depicting textures having different colors, patterns, and/or other visual characteristics between the glyphs. By utilizing multiple glyphs from an embedded text with kerning-adjustments, the texture extraction system 106 generates a synthesized texture that accurately represents the variations of visual characteristics across the set of glyphs such that the synthesized texture holistically accounts for a texture that is depicted across an embedded text from the digital image.

Figure 5:
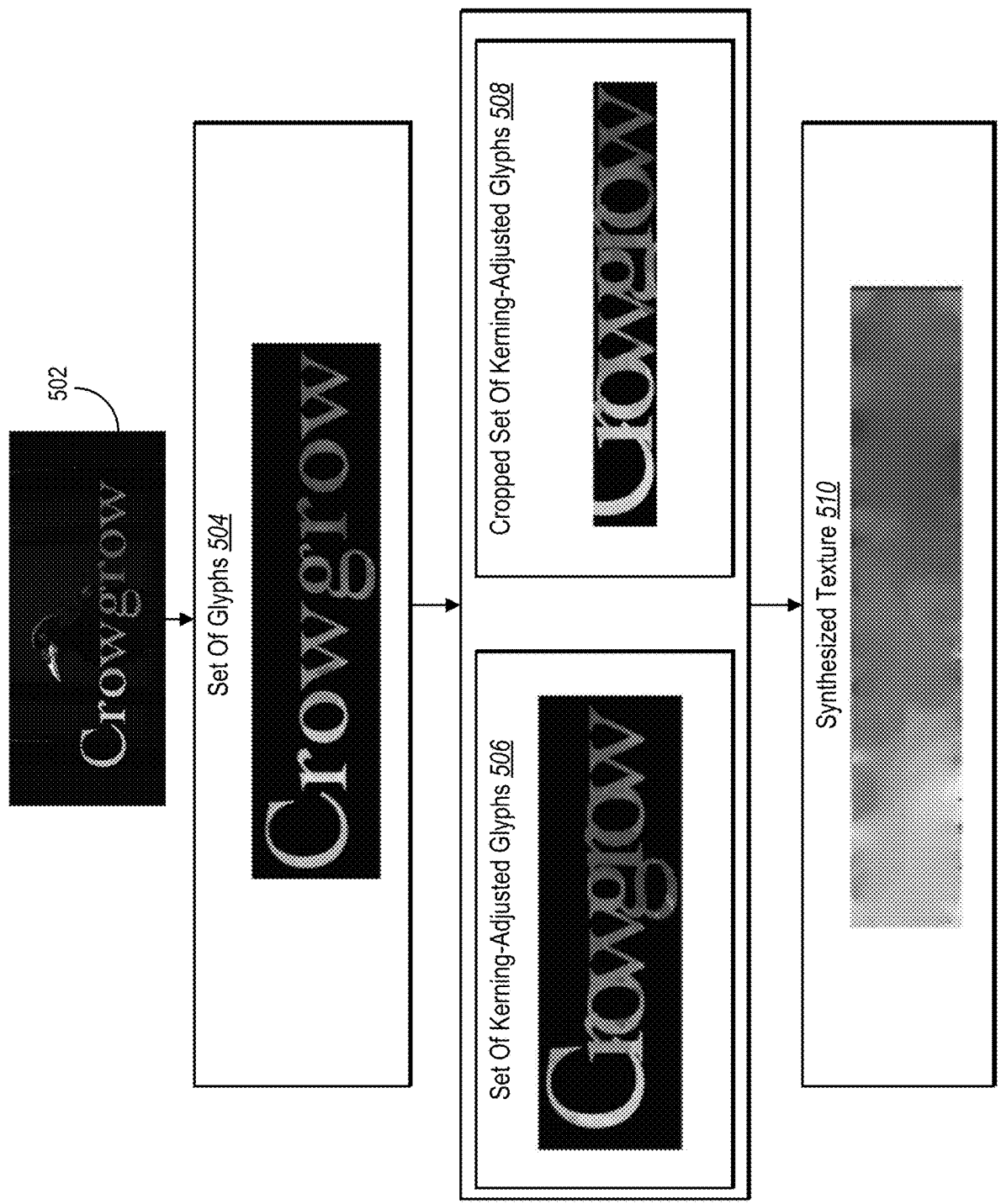
FIG. 5 illustrates a texture extraction system generating a synthesized texture from an embedded text that includes varying textures across glyphs in accordance with one or more implementations.

As an example, FIG. 5 illustrates the texture extraction system 106 generating a synthesized texture from an embedded text of a digital image that includes variation in texture across glyphs of the embedded text. As shown in FIG. 5, the texture extraction system 106 extracts a set of glyphs 504 that include varying textures (using text recognition and text segmentation as described above) from digital image 502. Then, as shown in FIG. 5, the texture extraction system 106 generates a set of kerning-adjusted glyphs 506 (utilizing kerning values as described above). Indeed, as further shown in FIG. 5, the texture extraction system 106 generates a synthesized texture 510 that accounts for the varying changes in texture across the multiple glyphs by inpainting (as described above) the set of kerning-adjusted glyphs 506.

In certain instances, as shown in FIG. 5, the texture extraction system 106 crops the set of kerning-adjusted glyphs 506 prior to generating the synthesized texture 510. In particular, as illustrated in FIG. 5, the texture extraction system 106 crops the set of kerning-adjusted glyphs 506 to generate a cropped set of kerning-adjusted glyphs 508. As shown in FIG. 5, the texture extraction system 106 crops the set of kerning-adjusted glyphs 506 along a lowest-height glyph (or lowest-height glyph bounding box) from the set of kerning-adjusted glyphs 506 to generate the cropped set of kerning-adjusted glyphs 508. Moreover, in one or more implementations, the texture extraction system 106 generates a synthesized texture (e.g., the synthesized texture 510) by inpainting the cropped set of kerning-adjusted glyphs 508. By doing so, in some implementations, the texture extraction system 106 further reduces the needed processing resources to inpaint a set of kerning-adjusted glyphs as the texture extraction system 106 fills less gaps between the kerning-adjusted glyphs to generate an accurate synthesized texture from a cropped set of kerning-adjusted glyphs.

Figure 6:
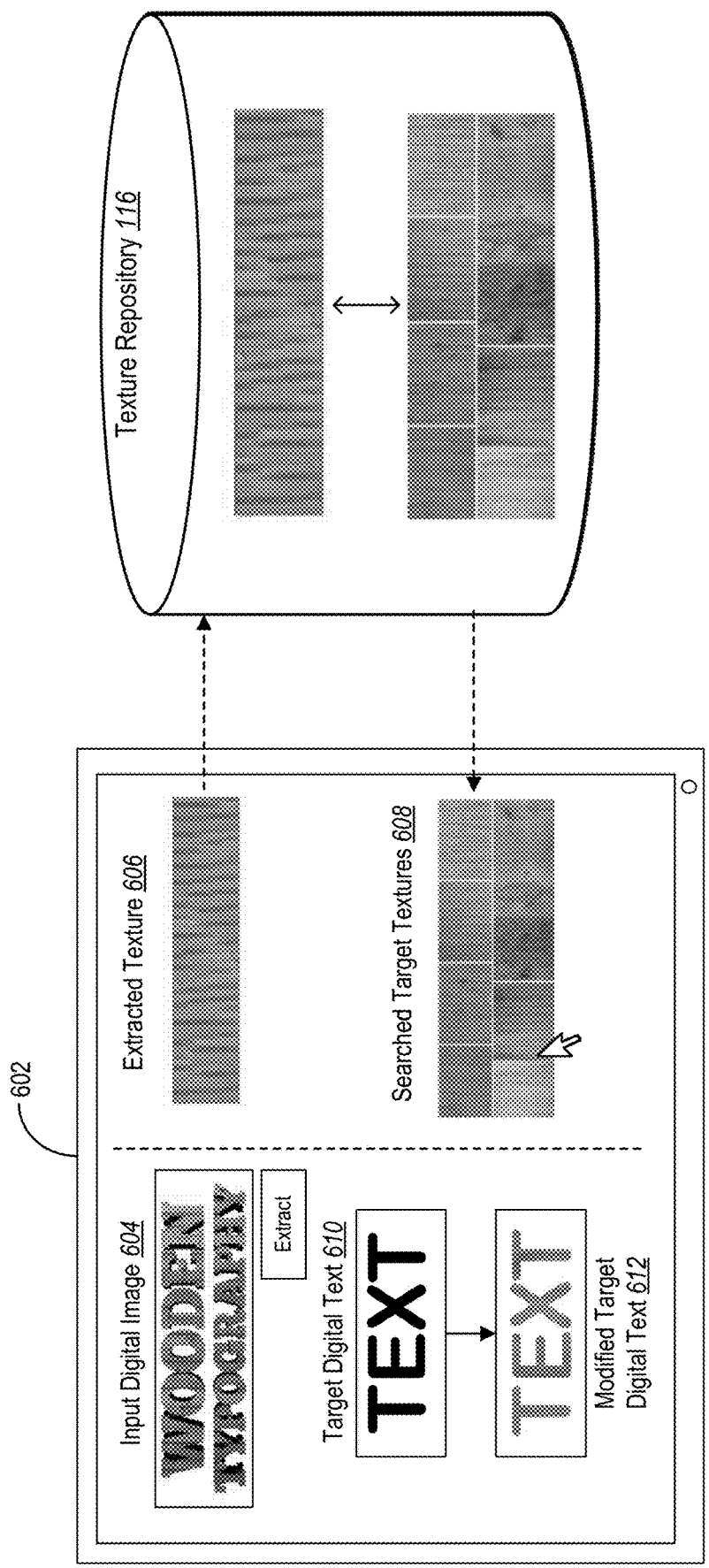
FIG. 6 illustrates a texture extraction system applying a texture to a target digital text based on a synthesized texture in accordance with one or more implementations.

As mentioned above, in one or more implementations, the texture extraction system 106 applies a texture to a target digital object (e.g., text) based on a generated synthesized texture from an embedded text depicted within a digital image. For example, FIG. 6 illustrates the texture extraction system 106 applying a texture to a target digital text utilizing a synthesized texture (e.g., an extracted texture) from embedded text depicted within a digital image. For instance, as shown in FIG. 6, the texture extraction system 106 receives an input digital image 604 on a client device 602 and utilizes the input digital image 604 to generate an extracted texture 606 (e.g., synthesized texture) from the embedded text within the input digital image 604 (in accordance with one or more implementations herein).

Subsequently, as shown in FIG. 6, the texture extraction system 106 utilizes the extracted texture 606 to search for target textures within the texture repository 116 (e.g., utilizing an image-based search engine). Indeed, as shown in FIG. 6, the texture extraction system 106 identifies various searched target textures 608 that are similar to the extracted texture 606. As further shown in FIG. 6, the texture extraction system 106 also receives a selection of a target texture from the searched target textures 608 (e.g., displayed on a graphical user interface of the client device 602). Indeed, upon receiving the selection of the target texture, the texture extraction system 106 applies the target texture to a target digital text 610 to generate a modified target digital text 612 (e.g., for display on the graphical user interface of the client device 602). Indeed, the texture extraction system 106, in some instances, applies the target texture to the target digital text 610 upon receiving, from the client device 602, a request to modify the target digital text 610 utilizing the selected target texture.

Indeed, in some instances, the texture extraction system 106 utilizes target textures that are configured to apply to various target digital text objects. As an example, the target textures include predetermined textures that have settings and/or configurations that apply to a digital text object. Furthermore, in some implementations, a target digital text object is modified by filling the target digital text object using a target texture (that is identified using the synthesized texture from the text embedded within the digital image).

Moreover, in one or more implementations, a target digital text includes a modifiable digital text object or digital text image. For example, a target digital text includes a live vector text object and/or a text identified within another digital image. In certain instances, the texture extraction system 106 utilizes a target digital text by applying a synthesized texture to each live vector text object character in a text collection (or text style). In some implementations, the texture extraction system 106 applies the synthesized texture to portions of a digital image where text is identified to modify the depicted text within a digital image.

In some instances, as mentioned above, the texture extraction system 106 directly applies a synthesized texture from an embedded text of a digital image to a target digital text object to modify a target digital text. In particular, the texture extraction system 106 utilizes the synthesized texture to fill a target digital text such that the target digital text depicts a visual characteristic that is similar to the synthesized texture. For example, the texture extraction system 106 utilizes scaling, fitting, and/or repetition of a synthesized texture to fill a target digital text with the synthesized texture. For example, in reference to FIG. 6, the texture extraction system 106 receives a request to apply the extracted texture 606 to the target digital text 610. In response, in one or more implementations, the texture extraction system 106 fits the extracted texture 606 onto the target digital text 610 to generate a modified target digital text that visually depicts the extracted texture 606. In one or more implementations, the texture extraction system 106 utilizes a modified target digital text that includes a synthesized texture (generated as described above) with a computer vision task or project (e.g., another digital image, a digital video, and/or electronic document).

Figure 7:
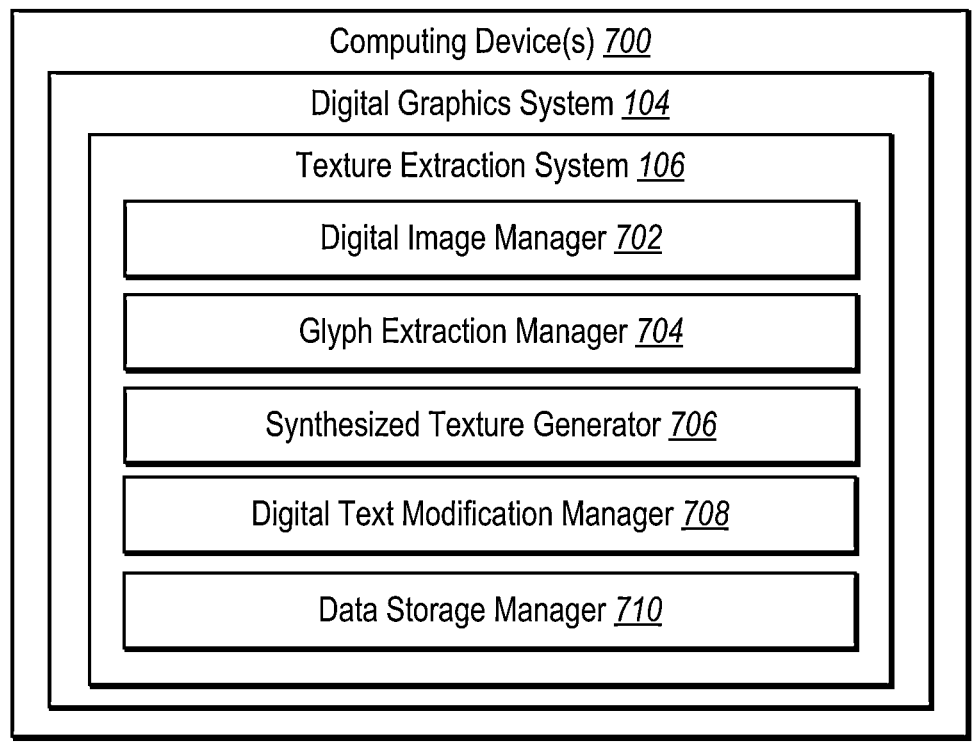
FIG. 7 illustrates a schematic diagram of a texture extraction system in accordance with one or more implementations.

Turning now to FIG. 7, additional detail will be provided regarding components and capabilities of one or more implementations of the texture extraction system. In particular, FIG. 7 illustrates an example texture extraction system 106 executed by a computing device 700 (e.g., server device(s) 102 or the client device 110). As shown by the implementation of FIG. 7, the computing device 700 includes or hosts the digital graphics system 104 and the texture extraction system 106. Furthermore, as shown in FIG. 7, the texture extraction system 106 includes a digital image manager 702, a glyph extraction manager 704, a synthesized texture generator 706, digital text modification manager 708, and a data storage manager 710.

As just mentioned, and as illustrated in the implementation of FIG. 7, the texture extraction system 106 includes the digital image manager 702. For example, the digital image manager 702 receives, retrieves, and/or stores one or more digital images that depict text as described above (e.g., in relation to FIG. 2). Furthermore, in some implementations, the digital image manager 702 also receives, retrieves, and/or stores one or more textures (or digital images that depict textures) as described above (e.g., in relation to FIGS. 1 and 6).

Moreover, as shown in FIG. 7, the texture extraction system 106 includes the glyph extraction manager 704. For instance, the glyph extraction manager 704 identifies text depicted within digital images utilizing a text recognition model as described above (e.g., in relation to FIG. 2). Additionally, in one or more implementations, the glyph extraction manager 704 also segments text identified in digital images to extract one or more glyphs from the digital image utilizing a text segmentation model as described above (e.g., in relation to FIG. 2).

Furthermore, as illustrated in FIG. 7, the texture extraction system 106 includes the synthesized texture generator 706. In one or more implementations, the synthesized texture generator 706 determines kerning values between consecutive glyphs from a set of glyphs based on kerning distances between bounding boxes and/or multiple kerning distances between multiple partitions of the glyphs as described above (e.g., in relation to FIGS. 3-5). In addition, in one or more implementations, the synthesized texture generator 706 adjusts positions of glyphs in a set of glyphs utilizing kerning values to generate a set of kerning-adjusted glyphs as described above (e.g., in relation to FIGS. 3-5). Moreover, in certain instances, the synthesized texture generator 706 generates a synthesized texture by inpainting the textures corresponding to the set of kerning-adjusted glyphs as described above (e.g., in relation to FIGS. 3-5).

Moreover, as shown in FIG. 7, the texture extraction system 106 includes the digital text modification manager 708. In some implementations, the digital text modification manager 708 utilizes a synthesized texture from text depicted in an input digital image to search for target textures as described above (e.g., in relation to FIG. 6). In addition, in one or more implementations, the digital text modification manager 708 receives selections of target textures and applies selected target textures to target digital text to modify the target digital text as described above (e.g., in relation to FIG. 6). Furthermore, in one or more implementations, the digital text modification manager 708 directly applies a generated synthesized texture to a target digital text as described above (e.g., in relation to FIG. 6).

Additionally, as shown in FIG. 7, the texture extraction system 106 includes the data storage manager 710. In some implementations, the data storage manager 710 is implemented by one or more memory devices. Moreover, in one or more implementations, the data storage manager 710 maintains data to perform one or more functions of the texture extraction system 106. For instance, the data storage manager 710 includes image data (e.g., input digital images, textures, segmented digital images, glyphs), glyph parameters (e.g., kerning distances, kerning values), and digital text objects (e.g., live vector text, modified digital text objects).

Each of the components 702-710 of the computing device 700 (e.g., the computing device 700 implementing the texture extraction system 106), as shown in FIG. 7, may be in communication with one another using any suitable technology. The components 702-710 of the computing device 700 can comprise software, hardware, or both. For example, the components 702-710 can comprise one or more instructions stored on a computer-readable storage medium and executable by processor of one or more computing devices. When executed by the one or more processors, the computer-executable instructions of the texture extraction system 106 (e.g., via the computing device 700) can cause a client device and/or server device to perform the methods described herein. Alternatively, the components 702-710 and their corresponding elements can comprise hardware, such as a special purpose processing device to perform a certain function or group of functions. Additionally, the components 702-710 can comprise a combination of computer-executable instructions and hardware.

Furthermore, the components 702-710 of the texture extraction system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-710 may be implemented as a stand-alone application, such as a desktop or mobile application. Furthermore, the components 702-710 may be implemented as one or more web-based applications hosted on a remote server. The components 702-710 may also be implemented in a suite of mobile device applications or "apps." To illustrate, the components 702-710 may be implemented in an application, including but not limited to, ADOBE SENSEI, ADOBE ILLUSTRATOR, ADOBE ACROBAT READER, ADOBE PRINT, and ADOBE PHOTOSHOP. "ADOBE," "ADOBE SENSEI," "ADOBE ILLUSTRATOR," "ADOBE ACROBAT READER," "ADOBE PRINT," and "ADOBE PHOTOSHOP." are either registered trademarks or trademarks of Adobe Inc. in the United States and/or other countries.

Figure 8:
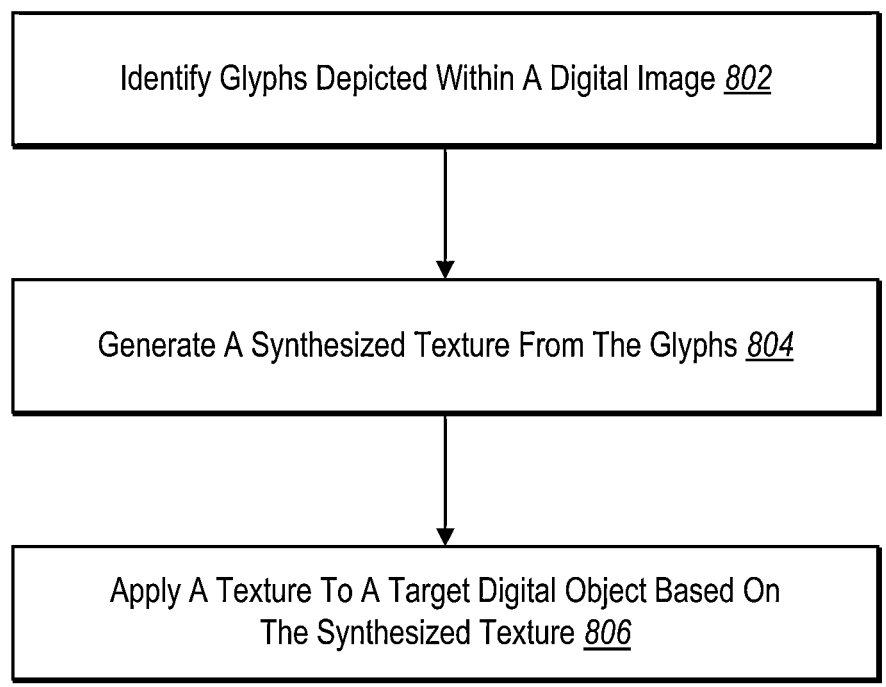
FIG. 8 illustrates a flowchart of a series of acts for extracting a texture from embedded text depicted within a digital image in accordance with one or more implementations.

FIGS. 1-7, the corresponding text, and the examples provide a number of different methods, systems, devices, and non-transitory computer-readable media of the texture extraction system 106. In addition to the foregoing, one or more implementations can also be described in terms of flowcharts comprising acts for accomplishing a particular result, as shown in FIG. 8. The acts shown in FIG. 8 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 8. In some implementations, a system can be configured to perform the acts of FIG. 8. Alternatively, the acts of FIG. 8 can be performed as part of a computer-implemented method.

As mentioned above, FIG. 8 illustrates a flowchart of a series of acts 800 for extracting a texture from embedded text depicted within a digital image. While FIG. 8 illustrates acts according to one implementation, alternative implementations may omit, add to, reorder, and/or modify any of the acts shown in FIG. 8.

As shown in FIG. 8, the series of acts 800 include an act 802 of identifying glyphs depicted within a digital image. In particular, in one or more implementations, the act 802 includes identifying a set of glyphs depicted within a digital image. In some instances, a set of glyphs depict a set of glyph textures. Furthermore, in one or more implementations, the act 802 includes identifying glyphs depicted within a digital image utilizing a text recognition model. Moreover, in some instances, the act 802 includes segmenting glyphs from a digital image to generate a text-digital image depicting a set of glyphs. In some implementations, the act 802 includes identifying a set of glyphs depicted within a digital image utilizing a text recognition model and a text segmentation model.

As shown in FIG. 8, the series of acts 800 include an act 804 of generating a synthesized texture from the glyphs. In particular, in one or more implementations, the act 804 includes generating a synthesized texture from a set of glyphs based on kerning-value-adjusted positions of the set of glyphs and a set of depicted glyph textures (of the glyphs). Furthermore, in some implementations, the act 804 includes determine kerning-value-adjusted positions of a set of glyphs by determining a kerning value between a first glyph and a second glyph from the set of glyphs and adjusting a position of the second glyph utilizing the kerning value to reduce a gap between the first glyph and the second glyph. In some cases, the act 804 includes determining a kerning value utilizing a kerning distance between a left-most position of a second glyph and a right-most position of a first glyph. In certain instances, the act 804 includes determining a kerning value by determining an average kerning distance between a first glyph and a second glyph utilizing multiple kerning distances from multiple partitions of the first glyph and the second glyph.

Furthermore, in some implementations, the act 804 includes generating a synthesized texture by inpainting portions of a text-digital image utilizing a set of depicted glyph textures within kerning-value-adjusted positions of a set of glyphs. In some cases, the act 804 includes generating a synthesized texture from a set of glyphs by determining a kerning value between a first glyph and a second glyph from the set of glyphs, adjusting a position of the second glyph utilizing the kerning value to reduce a gap between the first glyph and the second glyph to generate a set of kerning-adjusted glyphs, and inpainting the set of kerning-adjusted glyphs utilizing a depicted set of glyph textures (from the glyphs). Moreover, in some implementations, the act 804 includes inpainting a set of kerning-adjusted glyphs by filling a background within a text-digital image depicting the set of kerning-adjusted glyphs with a depicted set of glyph textures.

In certain implementations, the act 804 includes determining a kerning value utilizing a kerning distance between a right-most position of a first bounding box corresponding to a first glyph and a left-most position of a second bounding box corresponding to a second glyph and adjusting a position of a second glyph by reducing a left-most position of a second bounding box by the kerning value. Furthermore, in some implementations, the act 804 includes identifying, within a first partition of a first glyph and a second glyph, a first kerning distance utilizing a left-most position of the second glyph within the first partition and a right-most position of the first glyph within the first partition, identifying, within a second partition of the first glyph and the second glyph, a second kerning distance utilizing a left-most position of the second glyph within the second partition and a right-most position of the first glyph within the second partition, and determining a kerning value utilizing the first kerning distance and the second kerning distance. In some cases, the act 804 includes determining a kerning value utilizing an average of a first kerning distance and a second kerning distance (from multiple partitions of the first and second glyph). In addition, in one or more implementations, the act 804 includes adjusting a position of a second glyph by reducing a left-most position of a bounding box of the second glyph by a kerning value.

Furthermore, in some implementations, the act 804 includes identifying a lowest-height glyph from a set of kerning-adjusted glyphs. In addition, in certain instances, the act 804 includes cropping a set of kerning-adjusted glyph utilizing an upper boundary and a lower boundary of a lowest-height glyph.

In addition (or in alternative) to the acts above, the texture extraction system 106 can also perform a step for generating an inpainted texture utilizing position-adjusted glyphs from a set of glyphs. For instance, the acts and algorithms described above in relation to FIG. 3-5 (e.g., the acts 302-308, 402-408, and 502-510) comprise the corresponding acts and algorithms for performing a step for generating an inpainted texture utilizing position-adjusted glyphs from a set of glyphs.

As shown in FIG. 8, the series of acts 800 include an act 806 of applying a texture to a target digital text based on the synthesized texture. In particular, in one or more implementations, the act 806 includes applying a texture to a target digital text by fitting a synthesized texture on the target digital text. In some cases, the act 806 includes applying a synthesized texture to a target digital text. Moreover, in one or more implementations, the act 806 includes identifying a texture (to apply to a target digital text) from a repository of textures utilizing a synthesized texture. Furthermore, in some implementations, the act 806 includes searching for a set of target textures from a repository of textures utilizing a synthesized texture.

In certain implementations, the act 806 includes identifying a target texture from a set of textures utilizing an inpainted texture and applying the target texture to a target digital text. In one or more implementations, the act 806 includes identifying a target texture by searching for a set of target textures from a repository of textures utilizing an inpainted texture, providing the set of target textures for display within a graphical user interface of a client device, and receiving, from the client device, a selection of the target texture from the set of target textures. Moreover, in some implementations, the act 806 includes receiving, from a client device, a request to modify a target digital text utilizing a target texture.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
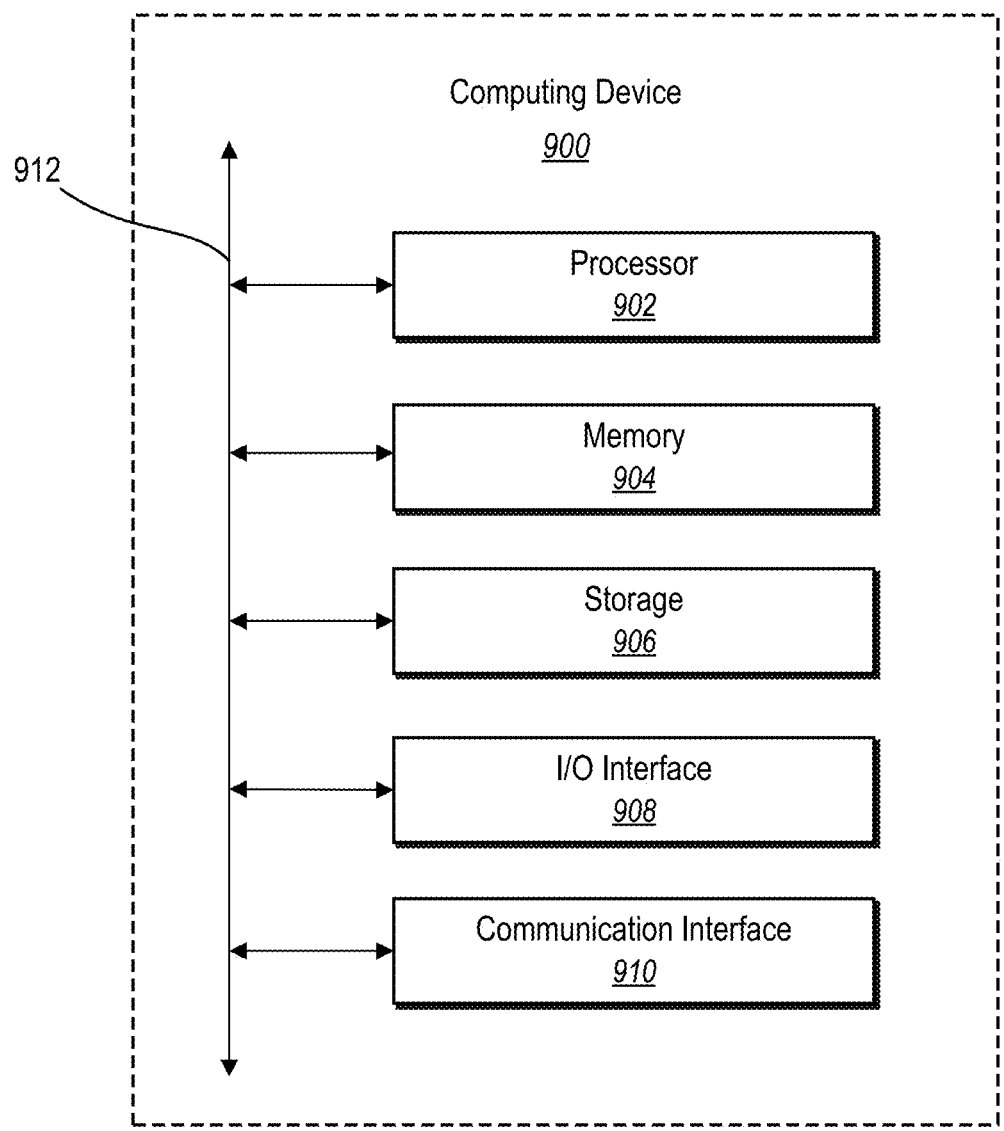
FIG. 9 illustrates a block diagram of an example computing device in accordance with one or more implementations.

FIG. 9 illustrates a block diagram of an example computing device 900 that may be configured to perform one or more of the processes described above. One will appreciate that one or more computing devices, such as the computing device 900 may represent the computing devices described above (e.g., computing device 700, server device(s) 102, client device 110, and/or texture repository 116). In one or more implementations, the computing device 900 may be a mobile device (e.g., a mobile telephone, a smartphone, a PDA, a tablet, a laptop, a camera, a tracker, a watch, a wearable device, etc.). In some implementations, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other implementations. Furthermore, in certain implementations, the computing device 900 includes fewer components than those shown in FIG. 9. Components of the computing device 900 shown in FIG. 9 will now be described in additional detail.

In particular implementations, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive ("HDD"), flash memory, a Universal Serial Bus ("USB") drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller ("NIC") or network adapter for communicating with an Ethernet or other wire-based network or a wireless NIC ("WNIC") or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause the at least one processor to perform operations comprising:
    identifying a set of glyphs depicted within a digital image, the set of glyphs depicting a set of glyph textures;
    generating a synthesized texture from the set of glyphs by extracting the set of glyph textures identified within the digital image based on kerning-value-adjusted positions of the set of glyphs; and
    applying a texture to a target digital object based on the synthesized texture.

2. The non-transitory computer-readable medium of claim 1, wherein the operations further comprise determining kerning-value-adjusted positions of the set of glyphs by:
    determining a kerning value between a first glyph and a second glyph from the set of glyphs; and
    adjusting a position of the second glyph utilizing the kerning value to reduce a gap between the first glyph and the second glyph.

3. The non-transitory computer-readable medium of claim 2, wherein the operations further comprise determining the kerning value utilizing a kerning distance between a left-most position of the second glyph and a right-most position of the first glyph.

4. The non-transitory computer-readable medium of claim 3, wherein the operations further comprise determining the kerning value by determining an average kerning distance between the first glyph and the second glyph utilizing multiple kerning distances from multiple partitions of the first glyph and the second glyph.

5. The non-transitory computer-readable medium of claim 1, wherein the operations identifying the set of glyphs by:
    identifying glyphs depicted within the digital image utilizing a text recognition model; and
    segmenting the glyphs from the digital image to generate a text-digital image depicting the set of glyphs.

6. The non-transitory computer-readable medium of claim 5, wherein the operations further comprise generating the synthesized texture by inpainting portions of the text-digital image utilizing the set of glyph textures within the kerning-value-adjusted positions of the set of glyphs.

7. The non-transitory computer-readable medium of claim 1, wherein the operations further comprise applying the texture to the target digital object by fitting the synthesized texture on target digital text.

8. The non-transitory computer-readable medium of claim 1, wherein the operations further comprise identifying the texture from a repository of textures utilizing the synthesized texture.

9. A system comprising:
    a memory component comprising a digital image depicting text; and
    a processing device coupled to the memory component, the processing device to perform operations comprising:
        identifying a set of glyphs depicted within the digital image, the set of glyphs depicting a set of glyph textures; and
        generating a synthesized texture by extracting the set of glyph textures from the set of glyphs by:

determining a kerning value between a first glyph and a second glyph from the set of glyphs;

adjusting a position of the second glyph utilizing the kerning value to reduce a gap between the first glyph and the second glyph to generate a set of kerning-adjusted glyphs; and inpainting the set of kerning-adjusted glyphs utilizing the set of glyph textures.

10. The system of claim 9, wherein the operations further comprise:

determining the kerning value utilizing a kerning distance between a right-most position of a first bounding box corresponding to the first glyph and a left-most position of a second bounding box corresponding to the second glyph; and adjusting the position of the second glyph by reducing the left-most position of the second bounding box by the kerning distance.

11. The system of claim 9, wherein the operations further comprise:

identifying, within a first partition of the first glyph and the second glyph, a first kerning distance utilizing a left-most position of the second glyph within the first partition and a right-most position of the first glyph within the first partition;

identifying, within a second partition of the first glyph and the second glyph, a second kerning distance utilizing a left-most position of the second glyph within the second partition and a right-most position of the first glyph within the second partition; and determining the kerning value utilizing the first kerning distance and the second kerning distance.

12. The system of claim 11, wherein the operations further comprise determining the kerning value utilizing an average of the first kerning distance and the second kerning distance.

13. The system of claim 11, wherein the operations further comprise adjusting the position of the second glyph by reducing a left-most position of a bounding box of the second glyph by the kerning value.

14. The system of claim 9, wherein the operations further comprise:

identifying a lowest-height glyph from the set of kerning-adjusted glyphs; and cropping the set of kerning-adjusted glyphs utilizing an upper boundary and a lower boundary of the lowest-height glyph.

15. The system of claim 9, wherein the operations further comprise inpainting the set of kerning-adjusted glyphs by filling a background within a text-digital image depicting the set of kerning-adjusted glyphs with the set of glyph textures.

16. The system of claim 9, wherein the operations further comprise applying the synthesized texture to a target digital text.

17. The system of claim 9, wherein the operations further comprise searching for a set of target textures from a repository of textures utilizing the synthesized texture.

18. A computer-implemented method comprising:

identifying a set of glyphs depicted within a digital image, the set of glyphs depicting a set of glyph textures;

performing a step for generating an inpainted texture utilizing position-adjusted glyphs from the set of glyphs to extract the set of glyph textures identified within the digital image;

identifying a target texture from a set of target textures utilizing the inpainted texture; and applying the target texture to a target digital object.

19. The computer-implemented method of claim 18, further comprising identifying the set of glyphs depicted within the digital image utilizing a text recognition model and a text segmentation model.

20. The computer-implemented method of claim 18, further comprising identifying the target texture by:

identifying the target texture by:

searching for the set of target textures from a repository of textures utilizing the inpainted texture;

providing the set of target textures for display within a graphical user interface of a client device; and receiving, from the client device, a selection of the target texture from the set of target textures; and receiving, from the client device, a request to modify the target digital object utilizing the target texture.

* * * * *